United States Patent [19]

Funhoff et al.

[11] Patent Number: 5,506,332

[45] Date of Patent: Apr. 9, 1996

[54] PREPARATION OF POLYACETALS, USE THEREOF AND NOVEL POLYACETALS

[75] Inventors: Angelika Funhoff, Heidelberg; Graham E. McKee, Weinheim; Heinrich Hartmann, Limburgerhof; Richard Baur, Mutterstadt; Alexander Kud, Eppelsheim; Volker Schwendemann, Neustadt, all of Germany

[73] Assignee: BASF Aktiengesellschaft, Ludwigshafen, Germany

[21] Appl. No.: 374,527

[22] PCT Filed: Aug. 16, 1993

[86] PCT No.: PCT/EP93/02176

§ 371 Date: Feb. 2, 1995

§ 102(e) Date: Feb. 2, 1995

[87] PCT Pub. No.: WO94/04585

PCT Pub. Date: Mar. 3, 1994

[30] Foreign Application Priority Data

Aug. 25, 1992 [DE]  Germany .......................... 42 28 159.8

[51] Int. Cl.$^6$ ..................................................... C08G 4/00
[52] U.S. Cl. .................... 528/232; 528/230; 528/243; 528/248; 528/250; 525/472; 524/773; 524/843; 252/32; 252/32.5; 252/174.23
[58] Field of Search ...................... 528/230, 232, 528/243, 248, 250; 525/472; 524/773, 843; 252/32, 32.5, 174.23

[56] References Cited

U.S. PATENT DOCUMENTS 4,169,934  10/1979  Papanu .

FOREIGN PATENT DOCUMENTS

0001004B1  8/1978  European Pat. Off. .

OTHER PUBLICATIONS

Houben–Weyl, vol. E30, Part 2, Georg Thieme Verlag, p. 1393 (1987).

Primary Examiner—Samuel A. Acquah
Attorney, Agent, or Firm—Oblon, Spivak, McClelland, Maier & Neustadt

[57] ABSTRACT

A process for preparing polyacetals by copolymerization of glyoxylic esters with other copolymerizable monomers in the presence of anionic or cationic polymerization initiators, with or without the introduction of stable end groups and with or without hydrolysis of the copolymerized units of glyoxylic ester present in the copolymer comprises using as monomers cyclic formals derived from diols, homopolymers of formaldehyde, trioxepane or mixtures thereof, although up to 50% by weight of this group of monomers may be replaced by other customary copolymerizable monomers, and the poly(acetal-carboxylate)s thus obtainable are useful as additives in reduced-phosphate and phosphate-free detergents and cleaners, as water treatment agents and as dispersants for finely divided substances.

8 Claims, No Drawings

PREPARATION OF POLYACETALS, USE THEREOF AND NOVEL POLYACETALS

RELATED APPLICATIONS

This application was filed as PCT International Application Number PCT/EP 93/02176 on Aug. 16, 1993.

The present invention relates to a process for preparing polyacetals by copolymerizing glyoxylic esters with other copolymerizable monomers in the presence of anionic or cationic polymerization initiators and optional hydrolysis of the copolymerized units of glyoxylic ester present in the copolymer, to the use of the copolymers thus obtainable as additive in detergents and cleaners, as water treatment agent, and as dispersant for finely divided substances, and to novel polyacetals.

EP-B-0 001 004 discloses polymeric acetalcarboxylates of the formula

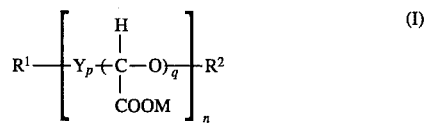

(I)

where

Y is at least one comonomer which is present in the polymer in random distribution, p is from 0 to 2, q is at least 1, $R^1$ and $R^2$ are chemically stable groups which stabilize the polymers against degradation at an alkaline pH, n is from 10 to 200, and M is an alkali metal, ammonium, $C_1$–$C_4$-alkyl or an alkanolamine having from 1 to 4 carbon atoms.

The poly(acetal-carboxylate)s are prepared by homopolymerization of glyoxylic esters or by copolymerization of glyoxylic esters with copolymerizable compounds, such as epoxides, aldehydes, carboxyl-containing compounds and mixtures thereof in the presence of cationic catalysts, such as boron trifluoride etherates, or anionic initiators, such as sodium methyl diethylmalonate. To stabilize the polyacetals thus obtainable against degradation at an alkaline pH, the ends of the polymer chains are tipped with chemically stable groups; for example, the substituents $R^1$ and $R^2$ in the formula I can each be alkyl, hydroxyalkyl or carboxymethyl. The poly(acetal-carboxylate)s of the formula I are used as builders in detergents and cleaners. The poly(acetal-carboxylate)s are biodegradable.

U.S. Pat. No. 4,169,934 discloses copolymers of the general formula

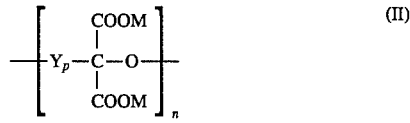

(II)

where p is at least 1, n is at least 2, Y is at least one monomer from the group of the olefins and the aldehydes having from 1 to 3 carbon atoms, and M is as defined in the formula I.

According to Example 1 of the cited patent, dimethyl ketomalonate is dissolved in methylene chloride and copolymerized with formaldehyde at about 0° C. using sodium diethyl methylmalonate as initiator. After the copolymerization trifluoroacetic acid and ethyl vinyl ether are added to the mixture and the ester groups of the copolymer are hydrolyzed with aqueous sodium hydroxide solution. The sodium salts of the copolymers thus obtainable are used as builders in detergents. The copolymers are stable under alkaline conditions, but depolymerize in an acid medium to form biodegradable fragments. In the process described in U.S. Pat. No. 4,169,934 the formaldehyde is introduced into the polymerizing mixture in gas form. The use of liquid formaldehyde as comonomer appears to be possible in principle, but is out of the question in industry because of the tendency of anhydrous formaldehyde to undergo explosive polymerization. According to the reaction scheme indicated in Houben-Weyl, Volume E30, Part 2, Georg Thieme Verlag, page 1393 (1987), anhydrous formaldehyde can be polymerized not only cationically but also anionically.

It is an object of the present invention to provide an improved process for preparing polyacetals by copolymerization of glyoxylic esters with formaldehyde and optionally with other copolymerizable monomers. It is a further object of the present invention to devise detergent additives, water treatment agents and dispersants for solid substances. It is yet a further object of the present invention to provide novel substances.

We have found that the first object is achieved by a process for preparing polyacetals by copolymerization of (a) glyoxylic esters with (b) other copolymerizable monomers in the presence of anionic or cationic polymerization initiators, with or without the introduction of stable end groups and with or without hydrolysis of the copolymerized units of monomer (a) present in the copolymer, which comprises using as monomers (b) cyclic formals derived from diols, homopolymers of formaldehyde, trioxepane or mixtures thereof, although up to 50% by weight of this group of monomers (c) may be replaced by other customary copolymerizable monomers.

We have found that the second object is achieved by using the polyacetals obtainable by the novel process as additive in reduced-phosphate and phosphate-free detergents and cleaners, as water treatment agent and as dispersant for finely divided substances.

We have found that the last object is achieved by polyacetals obtainable by anionically or cationically initiated polymerization of (a) glyoxylic esters with (b) cyclic formals derived from diols, with the exception of those cyclic formals which are derived from 1,2-diols, although if desired up to 50% by weight of this group of monomers may be replaced by other customary copolymerizable monomers, with or without the introduction of stable end groups and with or without hydrolysis of the ester groups of the copolymerized units of monomer (a) present in the copolymers.

Suitable for use as component (a) are glyoxylic esters which are obtainable for example by esterifying glyoxylic acid with $C_1$–$C_{20}$-alcohols, eg. methyl glyoxylate, ethyl glyoxylate, n-propyl glyoxylate, isopropyl glyoxylate, n-butyl glyoxylate, isobutyl glyoxylate, stearyl glyoxylate and palmityl glyoxylate. The use of methyl glyoxylate and ethyl glyoxylate is particularly preferred. The compounds of component (a) are polymerized in a virtually anhydrous form. If the aldehyde group of the ester is in the form of a hemiacetal, the alcohol moiety should be eliminated, for example by treatment with phosphorus pentoxide, and the resulting aldehyde purified by distillation.

Suitable monomers for use as component (b) according to the invention are cyclic formals derived from diols. These cyclic formals are obtainable by reacting diols with formaldehyde. For instance, dioxolane is obtained by reacting ethylene glycol with formaldehyde. Further suitable cyclic formals are 1,3-propanediol formal, 1,2-propanediol formal, 1,4-butanediol formal, 1,3,6-trioxocane (reaction product of diethylene glycol and formaldehyde) and 1,5-pentanediol formal.

Also suitable for use as component (b) are homopolymers of formaldehyde, eg. trioxane and other cyclic oligomers of formaldehyde, eg. 1,3,5,7-tetraoxocane, and also polyformaldehyde. The group of monomers suitable for use as component (b) also includes trioxepane, which can be prepared by reacting dioxolane and formaldehyde under acid catalysis. In the copolymerization the compounds of group (b) can be used alone or as a mixture of 2 or more components of this group.

The monomers of group (a) can be copolymerized with the monomers of group (b) in any desired ratio. For example, the copolymerization may be carried out with the monomers (a) in an amount of from 1 to 99, preferably from 50 to 95, % by weight and the monomers (b) in an amount of from 99 to 1, preferably from 5 to 50, % by weight. The monomers of group (b) may if desired be replaced to an extent of up to 50% by weight by other customary monomers copolymerizable with the monomers (a), these other monomers being hereinafter referred to as monomers (c). Suitable monomers (c) are mentioned for example in previously cited EP-B-0 001 004. These comonomers are epoxides, aldehydes having at least 2 carbon atoms, tetrahydrofuran and/or $C_2$–$C_4$-olefins. Specific examples are ethylene oxide, propylene oxide, butylene oxide, styrene oxide, ethylene, propylene, isobutene, tetrahydrofuran, glycidyl compounds, cyclohexene oxide, epoxidized fatty acid esters, eg. glycidyl acrylate and glycidyl methacrylate, glycidol, acetaldehyde, n-propionaldehyde, n-butyraldehyde, isobutyraldehyde, n-pentanal, n-hexanal, acrolein, methacrolein, crotonaldehyde, including isomer mixtures; hydroxypivalaldehyde and also crosslinking aldehydes such as glyoxal.

Suitable polymerization initiators are anionic or cationic initiators which are likewise mentioned in previously cited EP-B-0 001 004. Examples of suitable anionic polymerization initiators are the sodium derivatives of diethyl malonate, diethyl methylmalonate or dimethyl methylmalonate. The sodium derivatives of these esters are prepared for example by reacting the esters with sodium hydride. Other suitable anionic polymerization initiators are amines, such as triethylamine, 1,4-diazabicyclo[2,2,2]octane, pyrrocoline and quinolizidine, alkanolamines such as triethanolamine, alkali metal bases such as sodium hydroxide, potassium hydroxide and lithium hydroxide and also alkaline earth metal bases, for example calcium hydroxide, calcium oxide, barium hydroxide and barium oxide, or mixtures thereof, or alkaline earth metal hydrides such as calcium hydride.

Examples of suitable cationic initiators are boron trifluoride etherates, eg. the complex of boron trifluoride and diethyl ether or complexes of boron trifluoride and phenol. Also, $BF_3$ alone can be used as polymerization initiator. However, it is also possible to use mixtures of multiple cationic or of multiple anionic initiators. The amount of initiator is in each case from 5 to 500 ppm, based on the monomers used. However, the catalysts can also be used in concentrations of up to about 1% by weight or higher.

The copolymerization is preferably carried out in an inert organic solvent, eg. acetonitrile, methylene chloride, pentane, hexane, cyclohexane, toluene, dioxane, diethylene glycol dimethyl ether, ethylene glycol dimethyl ether, propionitrile, benzonitrile and i-butyronitrile. It is also possible to use mixtures of 2 or more solvents or to carry out the copolymerization in the absence of solvents.

The copolymerization temperature is within the range from −20° to 100° C., preferably from 0° to 70° C. After the polymerization has ended, the ends of the polymer chains are capped with chemically stable groups by adding to the polyacetals groups which are stable to degradation at an alkaline pH. Groups of this kind are for example alkyl groups such as methyl, ethyl, propyl and butyl groups and others such as decyl, dodecyl and cycloalkyl groups; alkenes such as ethylene, propylene, butylene and higher olefins, also branched hydrocarbons such as 2-methylbutane or aromatic hydrocarbons such as toluene, xylene and cyclic hydrocarbons such as cyclohexane and cyclohexene; alcohols such as methanol, ethanol, glycol, butanediol; mercaptans such as methanethiol, 1,2-ethanedithiol; ethers such as dimethoxymethylene, also carboxyl containing compounds such as substituted malonic esters or salts and anhydrides such as acetic anhydride.

To introduce the stable end groups, the reaction mixture is admixed for example with the following compounds which add to the ends of the polymer chains: vinyl ethers such as vinyl ethyl ether, dihydropyrans, alkylating agents such as dimethyl sulfate, methyl iodide, ethers such as dimethoxymethylene, epichlorohydrin, epoxysuccinic esters and/or epoxybutyric esters.

Stabilization through addition of specific groups to the polyacetals is not absolutely necessary and is carried out only in those cases where the polyacetals have to meet enhanced stability requirements in the alkaline pH range. In the anionically initiated polymerization, stabilizing end groups are preferably always introduced into the polymers. The copolymers can be isolated directly from the reaction mixture or else be subjected to a hydrolysis. To this end the copolymers are treated in an aqueous medium with bases, for example alkali metal bases such as sodium hydroxide solution, potassium hydroxide solution, sodium carbonate or potassium carbonate, with alkaline earth metal bases, such as calcium hydroxide or barium hydroxide, or with ammonia and amines such as triethanolamine, ethanolamine or triethylamine, or mixtures thereof. This then gives the salts of the copolymers, of which in particular the alkali metal and ammonium salts are of significance for practical use. The salts can be used to prepare polyacetals which contain free carboxyl groups.

The hydrolyzed copolymers are used as additive in reduced-phosphate and phosphate-free detergents and cleaners. Reduced-phosphate detergents are for the purposes of the present invention detergents whose phosphate content is less than 25% by weight, calculated as sodium triphosphate. The compositions of detergent and cleaner formulations can differ greatly. Detergent and cleaner formulations customarily contain from 2 to 50% by weight of surfactants with or without builders. These figures apply both to liquid and to pulverulent detergent and cleaner formulations. Examples of the compositions of detergent formulations which are customary in Europe, the USA and Japan can be found in table form for example in Chemical and Eng. News 67 (1989), 35. Further details concerning the compositions of detergents and cleaners can be found in WO-A-90/13581 and in Ullmanns Encyklopädie der technischen Chemie, Verlag Chemie, Weinheim 1983, 4th Edition, pages 63–160. Also of interest are those detergent formulations which contain up to 60% by weight of alkali metal silicate and up to 10% by weight of a polyacetal prepared according to the present invention.

The detergents may additionally contain a bleaching agent, for example sodium perborate, which if used can be present in the detergent formulation in an amount of up to 30% by weight. Detergents and cleaners may additionally contain further customary additives, for example complexing agents, opacifiers, optical brighteners, enzymes, perfume oils, color transfer inhibitors, grayness inhibitors and/or bleach activators.

The polyacetals are used in detergents in amounts from 0.5 to 20, preferably from 2 to 10, % by weight.

The hydrolyzed and neutralized polyacetals are also used as water treatment agents. They are effective in preventing the formation of troublesome deposits in water-conveying plant, such as coolers, boilers and evaporators. An example of a use of this kind is in evaporation plant for sea water desalination. Based on water, the polyacetals are used in amounts of from 1 to 1000, preferably from 2 to 100, ppm.

The hydrolyzed and neutralized polyacetals are also suitable for use as dispersants for finely divided substances, eg. clays, chalk, calcium carbonate, titanium dioxide, iron oxides, kaolins, aluminum oxide, cement and oxidic glazes for ceramic purposes.

If used as dispersants, it is customarily necessary to employ from 0.02 to 1% by weight, based on the finely divided substances.

Anionic copolymerization of (a) glyoxylic esters with (b) cyclic formals derived from diols or cyclic polymers of formaldehyde and optional hydrolysis of the ester groups of the copolymerized units of monomer (a) present in the copolymers results in carboxylato- or carboxyl-containing polyacetals. The formation of polyacetals of this kind was unforeseeable, since it is known from Houben-Weyl, Volume E30, Part 2, Georg Thieme Verlag, page 1396 (1987), that for example 1,3,5-trioxane and other cyclic oligomers of formaldehyde can be polymerized only with a cationic initiator. The results of anionically copolymerizing methyl glyoxylate with dioxolane are, for example, polyacetals which contain the following structural units:

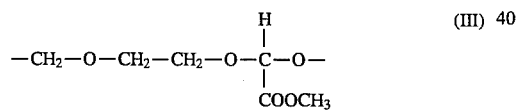

(III)

The preferred monomers of group (b) for preparing these polyacetals are dioxolane, butanediol formal and/or 1,3,5-trioxane. The polyacetals obtained by anionic polymerization of glyoxylic esters with cyclic formals or cyclic polymers of formaldehyde are novel substances. They have a lower residual monomer content and higher molecular weights than the glyoxylic esters obtainable using formaldehyde as the monomer of component (b). The copolymers obtainable by the process of the invention have K values (determined by the method of H. Fikentscher on a 1% strength by weight aqueous solution of the sodium salt at pH 7 and 25° C.) of from 8 to 100, preferably of from 10 to 80.

In the examples the percentages are by weight. The K values were determined by the method of H. Fikentscher, Cellulose-Chemie 13 (1932), 58–64, 71–74, on 1% strength by weight aqueous solutions of the sodium salts of the polyacetals at 25° C. and pH 7.

EXAMPLE 1

A 100 ml capacity single neck flask equipped with a magnetic stirrer and a device for working under inert gas was charged under argon with 4.5 ml of acetonitrile, 15.9 g (181 mmol) of freshly distilled methyl glyoxylate and 1.8 g (24 mmol) of dioxolane. To this mixture was added 14 μl (0.027 mmol) of sodium diethyl methylmalonate in a single portion. An exothermic reaction occurred. By cooling the reaction mixture with an ice bath the reaction temperature was kept at below 10° C. The reaction mixture was subsequently polymerized at from 3° to 7° C. for 1.5 hours. The polymer solution was then admixed at 0° C. with 4.6 g (59 mmol) of dimethoxymethane and 4.4 g (31 mmol) of phosphorus pentoxide and thereafter with a further 4.6 g of dimethoxymethane. Following a reaction time of 3 hours 60 ml of 2 N sodium hydroxide solution were added to the reaction mixture, which was stirred and decanted. The copolymer was washed three times with 30 ml of saturated aqueous sodium bicarbonate solution each time and saponified with 25 ml of 10 N sodium hydroxide solution. The copolymer was precipitated from 1:1 v/v methanol/acetone. The yield was 90%, based on the sodium salt of the copolymer. The hydrolyzed product had a K value of 31.

EXAMPLE 2

The apparatus described in Example 1 was charged with 14.1 g (160 mmol) of methyl glyoxylate, 3.5 g (39 mmol) of trioxane and 4.5 ml of acetonitrile. Then 14 μl (0.027 mmol) of sodium diethyl methylmalonate were added. The reaction mixture began to heat up. The flask was placed in an ice bath and the reaction mixture was stirred for 1.5 hours. In succession, 4.6 g (59 mmol) of dimethoxymethane, 4.4 g (31 mmol) of phosphorus pentoxide and a further 4.6 g (59 mmol) of dimethoxymethane were added at an internal temperature of 0° C. Thereafter the reaction mixture was stirred for a further 3 hours. The copolymer was then washed with 60 ml of 2 N sodium hydroxide solution and stirred up, and the supernatant was decanted off. The copolymer was then washed three times with 30 ml of a saturated aqueous sodium bicarbonate solution and hydrolyzed and neutralized with 25 ml of 10 N sodium hydroxide solution. The copolymer was precipitated from 1:1 v/v methanol/acetone. The yield of sodium salt of the copolymer was quantitative. The K value of the copolymer was 29.

EXAMPLE 3

The apparatus described in Example 1 was charged with 8.8 g (100 mmol) of methyl glyoxylate, 8.8 g (119 mmol) of dioxolane and 4.5 ml of acetonitrile, and the initial charge was admixed with 14 μl (0.027 mmol) of sodium diethyl methylmalonate. The reaction mixture was then cooled down to 0° C. and stirred at that temperature for 1.5 hours. The resulting viscous mass was then admixed with 4.6 g (59 mmol) of dimethoxymethane, 4.4 g (31 mmol) of phosphorus pentoxide and 4.6 g (59 mmol) of dimethoxymethane and stirred at 0° C. for 3 hours. Then 60 ml of 2 N sodium hydroxide solution were added, the mixture was stirred, and the aqueous solution was decanted off. The copolymer left behind was washed three times with 30 ml of saturated aqueous sodium bicarbonate solution each time and then hydrolyzed and neutralized with 12 ml of 10 N sodium hydroxide solution. The product was precipitated from 1:1 v/v methanol/acetone. The yield of hydrolyzed and neutralized copolymer was 44%. The copolymer had a K value of 30.

COMPARATIVE EXAMPLE 1

The apparatus described in Example 1 was charged with 15 ml of dichloromethane and 35.2 g (400 mmol) of methyl glyoxylate, and the initial charge was cooled down to about 5° C. 1 ml of 0.05M sodium diethyl methylmalonate solution was then added. 10 g (333 mmol) of gaseous formaldehyde were then passed into the resulting mixture. A slow exothermic reaction occurred. After about 45 minutes 22 ml of dimethoxymethane and 8.8 g (62 mmol) of phosphorus pentoxide were added with ice bath cooling and the mixture was stirred at 5° C. for 3 hours. The copolymer was then washed first with 120 ml of 2 N sodium hydroxide solution and then three times with 60 ml of saturated aqueous sodium bicarbonate solution each time and thereafter saponified with 25 ml of 10 N sodium hydroxide solution. The polymer was precipitated from 1/1 acetone/methanol. The yield of sodium salt of the copolymer was 23%. The hydrolyzed product had a K value of 8.

COMPARATIVE EXAMPLE 2 (ANALOGOUSLY TO EXAMPLE 1 OF U.S. PAT. NO. 4,169,934)

The apparatus described in Example 1 was charged with 4 ml of dichloromethane and 17.4 g (0.1M) of diethyl ketomalonate, and the initial charge was cooled down to 0° C. Then 0.5 ml of a 0.05M sodium diethyl methylmalonate solution was added and gaseous formaldehyde was passed into the reaction mixture, at which point the polymerization started. The reaction mixture was stirred in an ice bath. After about 45 minutes the temperature of the reaction mixture had come back down to 0°–2° C. and 0.18 ml (1.5 mol %) of trifluoroacetic acid and 3.5 ml of ethyl vinyl ether were added to the mixture. The mixture was stirred at room temperature overnight and then admixed with approximately 2 ml of 1 N sodium hydroxide solution, and the volatiles were removed under reduced pressure. Then 12 ml of 5 N sodium hydroxide solution were added and the reaction mixture was stirred at 0° C. for 2 hours. It was then warmed to room temperature. The precipitate which had formed on addition of the 5 N sodium hydroxide solution was filtered off and dried. It was then dissolved in distilled water, precipitated from methanol and filtered off. The yield was 80%, and the K value was 9.5.

COMPARATIVE EXAMPLE 3

The apparatus described in Example 1 was charged with 4.5 ml of dichloromethane and 17.6 g (200 mmol) of methyl glyoxylate, and the initial charge was cooled down to 0° C. Then 13.9 µl of diethyl methylmalonate were added, which started an exothermic reaction. The reaction mixture was subsequently stirred in an ice bath for a further 1.5 hours, and then at 0° C. admixed with 4.6 g (59.3 mmol) of dimethoxymethane and 4.4 g (31 mmol) of phosphorus pentoxide. Thereafter a further 4.6 g (59.3 mmol) of dimethoxymethane were added. The mixture was subsequently stirred at that temperature for 3 hours, then washed with 60 ml of 2 N sodium hydroxide solution and three times with 30 ml of saturated sodium bicarbonate solution each time and saponified with 25 ml of 10 N sodium hydroxide solution. The polymer was precipitated from 1:1 methanol/acetone and had a K value of 43. The yield was quantitative.

The above-described copolymers and the homopolymer of Comparative Example 3 were tested as detergent additive. For this they were incorporated at 5% by weight in a detergent A of the following composition:

| Detergent A | |
|---|---|
| | Parts by weight |
| Sodium dodecylbenzenesulfonate | 6.25 |
| $C_{13}/C_{15}$ oxo alcohol alkoxylated with ethylene oxide in a molar ratio of 1:7 | 4.70 |
| Magnesium silicate | 1.25 |
| Sodium carbonate (anhydrous) | 10.00 |
| Sodium metasilicate × 5 $H_2O$ | 6.00 |
| Sodium perborate tetrahydrate | 20.00 |
| Sodium sulfate (anhydrous) | 6.75 |
| Soap | 2.80 |
| Sodium carboxymethylcellulose | 0.60 |
| Zeolite A | 30.00 |
| Polymer | 5.00 |
| Water remainder to | 100.00 |

The detergent formulation A was used to wash test cloths in woven cotton. The number of wash cycles was 15. After this number of washes the ash content of the cloth was determined by ashing each cloth at 700° C. for 2 hours.

The effect (W) of additives in this detergent A is reported in percent effectiveness on a scale where 0% effect corresponds to the ash content without incrustation inhibitor (A-without) (ie. without added copolymer) and 100% corresponds to the ash content of the cloth prior to washing (A-zero). The effect is then calculated from the ash content assuming a linear response.

$$W = \left( 1 - \frac{(A) - (A\text{-}zero)}{(A\text{-}without) - (A\text{-}zero)} \right) \times 100\%$$

The pre-wash ash content of the pure cotton cloth was 0.04%. The maximum ash content without inhibitor (A-without) was 6.91%. The ash content is denoted by A when the polymer is used.

Experimental conditions for determining the incrustation

Apparatus: Launder-O-meter from Atlas, Chicago

Number of wash cycles: 15

Wash liquor: 250 g, the water used containing 4 mmol of hardness per liter (molar ratio of calcium to magnesium equal to 4:1)

Washing time: 30 min at 60° C. (including heating-up time)

Detergent dosage: 7 g/l

Liquor ratio: 12.5:1

Test fabric: 20 g each

The absolute effect in % on using the polymers prepared in the Examples and Comparative Examples is indicated in the following table:

TABLE

| Polymer prepared in | | % effect of |
|---|---|---|
| Example | Comparative Example | polymer in detergent A |
| 1 | — | 47.8 |
| 2 | — | 60.4 |
| 3 | — | 38.9 |
| — | 1 | 10.0 |
| — | 2 | 0 |
| — | 3 | 52.1 |
| without polymer | 4 | 0 |

As the Examples and Comparative Examples show, the incrustation-inhibiting effect of the copolymers of glyoxylic esters and cyclic ethers is similar to that of the homopolymers of glyoxylic esters. This is surprising because it had to be expected that the incorporation of comonomers that do not carry carboxyl groups would result in a reduced incrustation-inhibiting performance.

A considerable advantage of the copolymers is their better biodegradability compared with the polyglyoxylates.

We claim:

1. A process for preparing polyacetals optionally having stable end groups by:

copolymerizing (a) glyoxylic esters with (b) other copolymerizable monomers, at least 50% of which monomers (b) are cyclic formals derived from diols, homopolymers of formaldehyde, trioxepane or mixtures thereof in the presence of anionic or cationic polymerization initiators, the glyoxylic ester monomer units optionally being hydrolyzed.

2. The process of claim 1, wherein said glyoxylic esters are selected from the group consisting of methyl glyoxylate, ethyl glyoxylate, n-propyl glyoxylate, isopropyl glyoxylate, n-butyl glyoxylate, isobutyl glyoxylate, stearyl glyoxylate and palmityl glyoxylate.

3. The process of claim 1, wherein the ratio of glyoxylic ester monomer to monomers (b) ranges from 1-99:99-1, on a weight % basis.

4. The process of claim 3, wherein said ratio ranges from 50-95:5-50.

5. The process of claim 1, wherein at least 50% of said monomers (b) are dioxolane, butanediol formal, trioxane or combinations thereof.

6. The process of claim 1, wherein up to 50% by weight of said monomers (b) are (c) epoxides, aldehydes having at least 2 carbon atoms, tetrahydrofuran,. $C_{2-4}$ olefins or combinations thereof.

7. The process of any one of claims 1–6, wherein the ends of the polyacetal chains are tipped with chemically stable groups which confer stability to the polyacetals against degradation at alkaline pH.

8. Polyacetals prepared by the process of claim 1.

* * * * *